United States Patent
Nurse, Jr. et al.

(10) Patent No.: US 6,338,797 B1
(45) Date of Patent: Jan. 15, 2002

(54) FILTER DEVICE FOR WASTEWATER TREATMENT SYSTEM

(75) Inventors: Harry L. Nurse, Jr., 12207 Plantation Blvd., Goshen, KY (US) 40026; Theophilis B. Terry, III, Sonora, KY (US)

(73) Assignee: Harry L. Nurse, Jr., Goshen, KY (US)

(*) Notice: Subject to any disclaimer, the term of this patent is extended or adjusted under 35 U.S.C. 154(b) by 0 days.

(21) Appl. No.: 09/592,388

(22) Filed: Jun. 13, 2000

(51) Int. Cl.[7] .................... B01D 21/24; B01D 29/37; B01D 35/027
(52) U.S. Cl. .................. 210/238; 210/256; 210/308; 210/338; 210/452; 210/532.2; 210/299
(58) Field of Search ................ 210/256, 299, 210/308, 337, 338, 339, 342, 452, 532.2, 238

(56) References Cited

U.S. PATENT DOCUMENTS

| | | | |
|---|---|---|---|
| 1,207,776 A | * 12/1916 | McDonald | 210/338 |
| 2,657,805 A | * 11/1953 | Paker | 210/338 |
| 2,792,118 A | * 5/1957 | Kraissl, Jr. | 210/452 |
| 3,347,386 A | * 10/1967 | Kraissl, Jr. | 210/452 |
| 3,443,666 A | * 5/1969 | Schwab | 210/338 |
| 5,242,584 A | 9/1993 | Hoarau | |
| 5,264,120 A | 11/1993 | Graves | |
| 5,413,706 A | 5/1995 | Graves | |
| 5,569,387 A | 10/1996 | Bowne et al. | |
| 5,683,577 A | 11/1997 | Nurse, Jr. | |
| 5,690,824 A | 11/1997 | Stuth | |
| 5,762,790 A | 6/1998 | Zoeller | |
| 5,762,793 A | 6/1998 | Nurse, Jr. | |
| 5,779,896 A | 7/1998 | Nurse, Jr. | |
| 5,871,640 A | 2/1999 | Gavin | |
| 5,885,452 A | 3/1999 | Koteskey | |
| 5,985,139 A | 11/1999 | Zoeller | |
| 6,015,488 A | 1/2000 | Gavin | |
| 6,136,190 A | * 10/2000 | Zoeller et al. | 210/532.2 |

* cited by examiner

Primary Examiner—Christopher Upton
(74) Attorney, Agent, or Firm—Charles G. Lamb; John F. Salazar; Middleton Reutlinger

(57) ABSTRACT

A two-piece filtering device for wastewater filtering systems is disclosed wherein the two-piece system is inserted into a tubular casing. The two-piece filtering system is comprised of an outer sleeve filter and an inner primary filter, the primary filter extending downwardly through an opening in the bottom portion of the sleeve filter and also having an opening formed in its end. After insertion into the tubular casing, the two-piece filtering system of the present invention forces effluent or other fluid to be treated upward through the interior of the primary filter, through slots formed in and subsequently through the sidewall of the sleeve filter. Thus, only treated effluent flows outward through the tubular casing outlet opening. The slots may be formed in both the sidewall of the primary filter and the sleeve filter. A seal may be provided between sidewall lower portion of the primary filter and may extend to the internal sidewall of the tubular casing to prevent untreated effluent therebetween. The design of the present invention is such that wastewater must pass through the primary filter and through the sleeve filter prior to exiting the tubular casing. Further, one embodiment the design allows for the cleaning of the internal sidewall of the sleeve filter upon removal of the primary filter. Another benefit of the design of the present invention is that upon removal of the primary filter, untreated wastewater will not flow through the tubular casing while the filter is being cleaned.

20 Claims, 6 Drawing Sheets

FILTER DEVICE FOR WASTEWATER TREATMENT SYSTEM

FIELD OF THE INVENTION

The present invention relates in general to filter devices and more particularly relates to a new fluid filter device comprised of a outer filtering element and an inner filtering element, both filtering elements having slots of preselected width. More particularly, the present invention is directed toward a filter device for a wastewater treatment system, namely wastewater treatment facilities such as septic tanks, wherein the filter is comprised of an inner filter and an outer filter.

DESCRIPTION OF THE PRIOR ART

A wide variety of filter devices for use in wastewater treatment systems are well known in the prior art, such as the filter disclosed in U.S. Pat. No. 5,382,357. These teachings provide for a filter element wherein the filter is inserted into a tubular casing and is comprised of a cylindrical filtering sleeve having slots formed therein of a predetermined width. The filter is designed for removal from the casing for cleaning and the like. Other filtering devices for similar purposes include stacked disc-dam filter elements as taught in U.S. Pat. Nos. 2,900,084 and 3,332,552. These references teach filter elements having effective removal characteristics for solid matter from fluids, particularly for treatment of sewage in septic tanks and for removal of other solid matter from liquids in wastewater treatment facilities.

All of these prior art filter devices are problematic in that they require complete removal of the filtering device from the casing for proper cleaning of the filtering mechanism. Further, only a single filtering screen is provided within these designs for filtering of the wastewater to be treated. There is also no mechanism to automatically clean the internal portions of the filtering mechanism for regular cleaning and maintenance.

SUMMARY OF THE INVENTION

It is therefor an object of the present invention to provide a solution to the above mentioned problems. The present invention relates in general to a filter device for waste water treatment systems and more particularly relates to an improved slotted filter element wherein a first filtering element is placed into the interior portion of a second filtering element and may extend downward therefrom.

One object of the present invention is to provide a filter device which allows streamlined fluid flow and improved overall performance of the wastewater treatment filtering system while also reducing the costs of the assembly relative to the cost of other types of filters.

Another object of the present invention is to provide a filtering system with increased filtering capacity in similar volume of space as other commercially available filters while also significantly reducing both assembly costs and material costs.

An even further object of the present invention is to provide a filtering system wherein removal of the interior filter will automatically clean the exterior sleeve filter.

All of the above mentioned objectives are met by the two-piece filter device for wastewater treatment systems of the present invention.

In general, the present invention provides for a two-piece wastewater treatment system and particularly a two-piece filtering system for insertion into septic tanks and other wastewater treatment devices. The two-piece wastewater treatment system of the present invention is comprised of a filter sleeve which is inserted into a casing set within a septic tank or like device and which receives a primary filter therein. Both the filtering sleeve and the primary filter may be cylindrical in design and may include therein a plurality of predefined slots in the tubular walls. Both the outer filter sleeve and the internal primary filter extend downward into the tubular or cylindrical casing and the predetermined slots extend all the way through the sidewalls of both filters. Both the primary filter and the filter sleeve have open bottom portions which allows the fluid within the septic tank or other device to flow upward and then outward through the predetermined and pre-sized slots and into an outlet in the casing.

Both of the primary filter and the sleeve filter extend downward into the tubular casing and have seals extending outward therefrom for sealing their cylindrical sidewall at a predetermined location with the sidewall of the tubular casing. By placing the outwardly extending seals at the lower periphery of both the interior primary filter and the exterior sleeve filter, the fluid to be treated is forced upward through the interior of the primary filter and then flows outward through its sidewall via the predefined slots and then through the sidewall of the filtering sleeve and its predetermined and presized slots into the tubular casing outlet opening.

The two-piece wastewater treatment system of the present invention allows for the primary filter to be removed from the sleeve filter, the sleeve filter retained within the tubular casing. Upon removal of the outwardly extending annular seal of the primary filter, may be designed such that, as the primary filter is removed from the cylindrical filtering sleeve, the internal sidewall of the filtering sleeve is cleaned by the outwardly extending annular seal of the primary filter. Further, upon removal of the primary filter, the sleeve filter remains and the wastewater remains filtered and no unfiltered fluid will be allowed to enter into the outlet opening of the tubular casing.

Arrangements within the scope of the present invention provide further advantages in that the filter element can be easily installed into standard size pipe used in plumbing so the filter element can be retrofitted into existing facilities without substantial modification of the treatment facilities.

Examples of arrangements within the scope of the present invention are illustrated in the accompanying drawings and described hereinafter but it will be understood that neither the drawings nor the descriptions thereof are presented by way of limitation and that other arrangements also within the scope of the present invention will occur to those skilled in the art upon reading the disclosure set forth herein.

DETAILED DESCRIPTION OF THE PREFERRED EMBODIMENT

Figure 1:
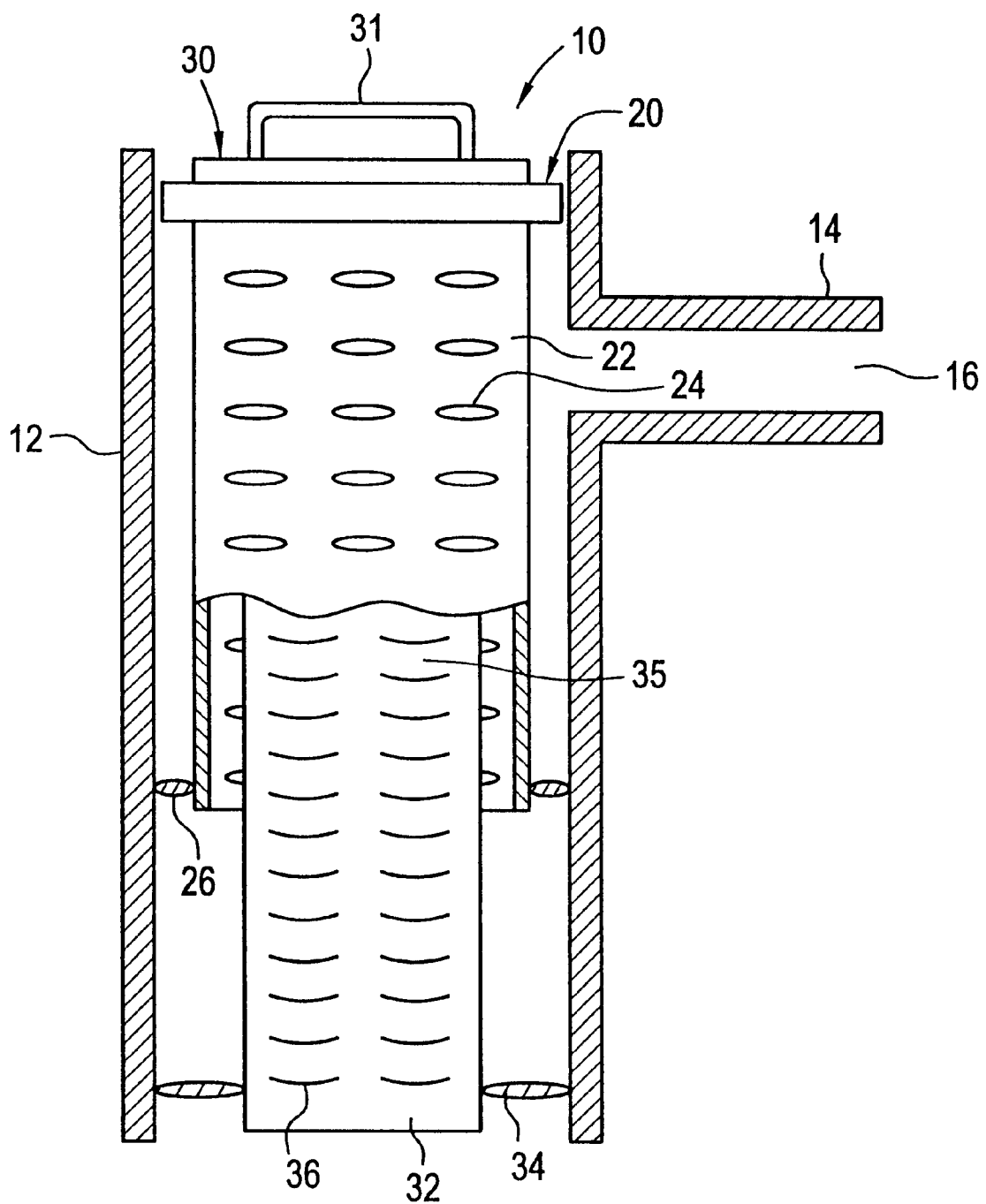
FIG. 1 is a detailed view of one preferred embodiment of the two-piece wastewater treatment system of the present invention in partial cross-section.

Shown in FIG. 1, the two-piece filter device for wastewater treatment system 10 of the present invention is detailed in partial cross-section within the tubular casing 12. In the preferred embodiment shown in FIG. 1, the two-piece filter system 10 works in accordance with the present invention wherein fluid to be treated enters the two-piece filter system 10 through the opening in the bottom of side-wall lower portion 32 of sleeve filter 20. The arrangement of the two-piece filter system 10 of the present invention is such that the sleeve filter 20 is inserted into the tubular casing 12 and may be retained therein by frictional engagement. The primary filter 30 may then be inserted into the interior of the sleeve filter 20 and retained in place. The sidewall lower portion 32 of the primary filter 30 may extend downward through the bottom open end of the sleeve filter 20 and extend toward the lower section of tubular casing 12. An annular seal 34 may extend outwardly from the sidewall lower portion 32 of primary filter 30 to provide sealing engagement between the primary filter and the tubular casing 12. In such an arrangement, the fluid is forced upward through the opening in the sidewall lower portion 32 which may then flow through slots 36 into the gap between sidewall 35 of the primary filter 30 and sidewall 22 of the sleeve filter 20. The fluid may then flow through the slots 24 of sidewall 22 and outward through outlet opening 16 of outlet 14 of the tubular casing 12.

It has been found that the slots 36 and 24 can be located in virtually any orientation and that the filtration can be successfully accomplished regardless of is the orientation of the slots. It has also been found that filter arrangements in accordance with the present invention may be generally self cleaning because the flow of fluid through the slots 36 tends to sweep the particular material out of the slots 36 and may then fall through the bottom opening of sidewall lower portion 32. Further, cleaning of the interior of sidewall 22 of sleeve filter 20 may occur when the primary filter 30 is removed from sleeve filter 20 and the seal 34, which may be somewhat pliable, sweeps upward along the interior of sidewall 22 thereby sweeping any particulate material which has formed on slots 36.

Returning to FIG. 1, it is apparent that the design of the two-piece filtering system 10 of the present invention allows wastewater fluid to be continually treated even after removal of the primary filter 30. The two-piece filter system 10 of the present invention has an outer sleeve filter 20 and inner primary filter 30, the primary filter having an upwardly extending handle 31 a for grasping and removing of the primary filter 30. The primary filter 30 may be removed for cleaning and the like if necessary. Upon removal however, the sleeve filter 20 remains retained within the tubular casing 12 continually filtering wastewater fluid through slots 24 of the sidewall 22.

As shown in FIG. 1, the sleeve filter 20 is tubular in nature and has sidewall 22 with slots 24 formed and extending therethrough. The slots formed in the sidewall 22 of sleeve filter 20 and sidewall 35 of primary filter 30 are depicted as being primarily horizontal in nature. In a preferred arrangement, the openings for slots 24 and 36 may be approximately ½ inch in diameter or potentially smaller. It is not necessary that the slots 24 and slots 36 be identical in size nor is it required that the slots be horizontally directed as depicted in FIG. 1. The depiction of the orientation for the slots is for explanation purposes only and variations in their orientation are considered to fall within the teachings of the present invention.

Figure 2:
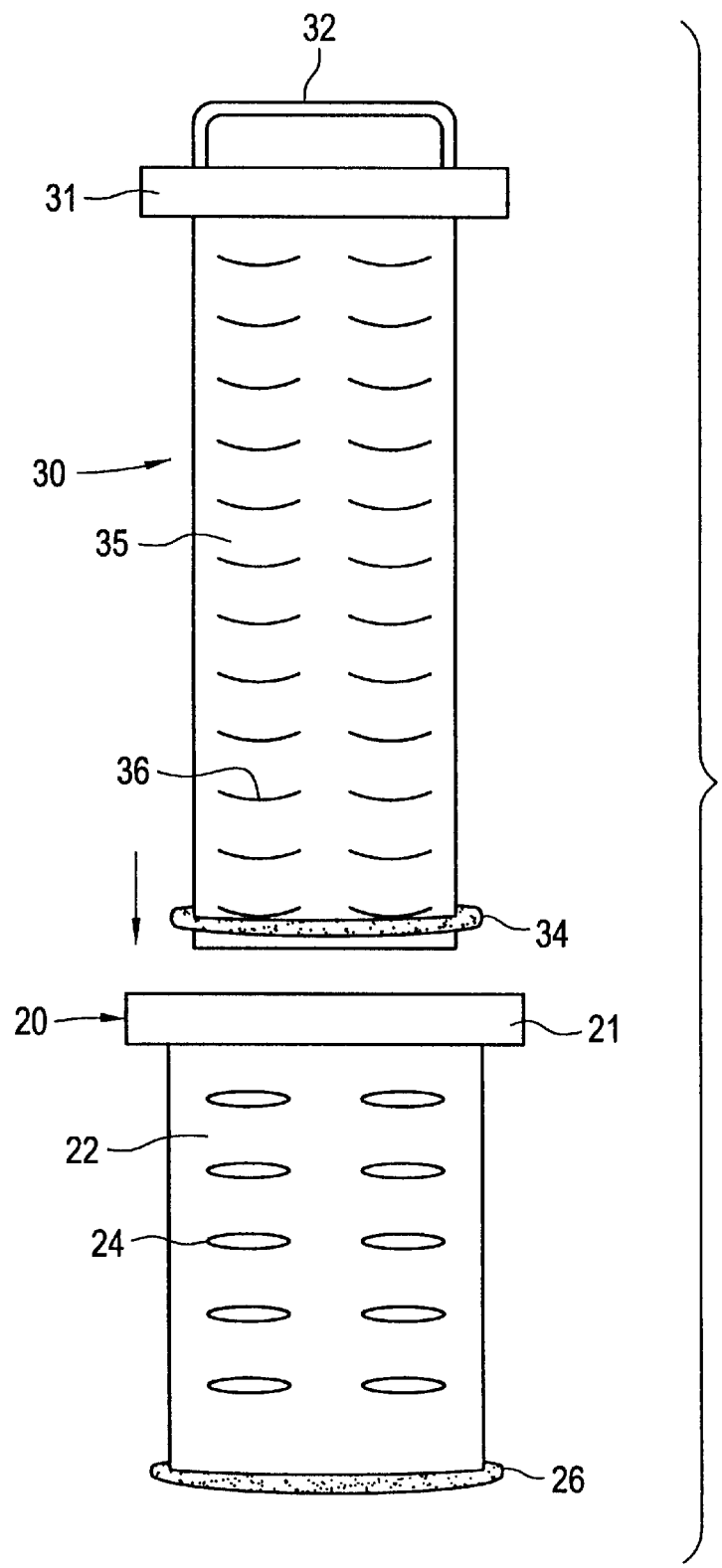
FIG. 2 is a side-view of the sleeve filter and primary filter of the two-piece wastewater treatment system of the present invention.

As shown in FIG. 1 and in FIG. 2, the sleeve filter 20 is retained within the tubular casing 12. Sleeve filter 20 has a top rim 21 having a larger diameter than the cylindrical sidewall 22. The diameter of top rim 21 may be such that a frictional engagement between the top rim 21 of sleeve filter 20 and the tubular casing 12, as is depicted in FIG. 1, occurs thereby firmly retaining the sleeve filter 20 in place. Depending downward from the top rim 21 is cylindrical sidewall 22. The lower end portion of sidewall 22 remains open as depicted in FIG. 1 and shown in FIG. 8 and the outer wall of sidewall 22 has an annular seal 26 extending outwardly therefrom. Annular seal 26 may be provided for sealing engagement between sidewall 22 and tubular casing 12.

Figure 8:
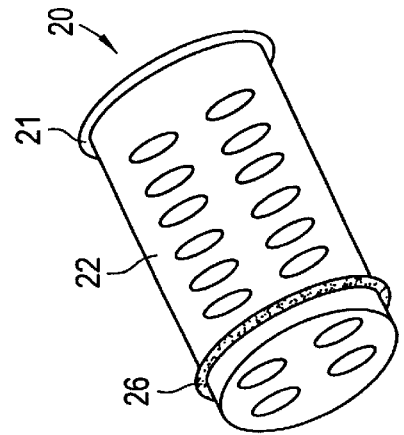
FIG. 8 is a perspective view of the sleeve filter of the present invention.
Figure 9:
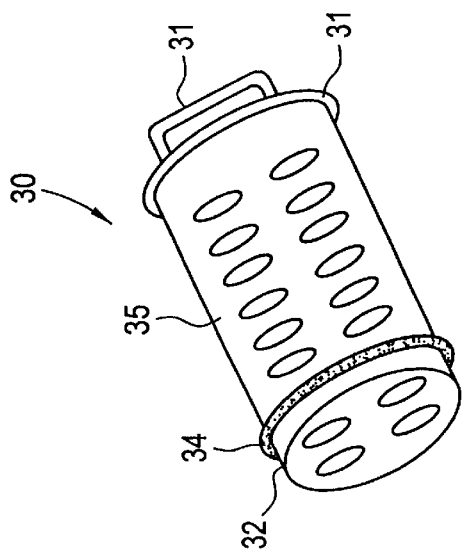
FIG. 9 is a perspective view of the primary filter of the two-piece wastewater treatment system of the present invention; and, FIG. 10 is a side view of an alternative embodiment of the primary filter of the present invention.

Internal of the sleeve filter 20 is located the primary filter 30. Primary filter 30 and sleeve filter 20 are depicted by example in FIG. 1, FIG. 2, FIG. 8 and FIG. 9 and the primary filter 30 may extend downwardly through the cylindrical sidewall of sleeve filter 20. Primary filter 30 has handle 31a extending upward from the top wall 31b. Depending from top wall 31b of the primary filter 30 is sidewall 35 having a plurality of slots 36 formed therein. Sidewall lower portion 32, at the opposite distal end of top wall 31b, has a similar bottom end opening as is formed in the bottom section of sidewall 22 of sleeve filter 20 as shown in FIGS. 8 and 9. The sidewall 35 extends downwardly through the bottom opening in sidewall 22 of the sleeve filter 20 and may extend to the lower extremity of tubular casing 12 and may extend downward past the lower end thereof. Sidewall 35 has a plurality of slots 36 formed therein and extending therethrough. Extending outwardly from the sidewall lower portion 32 is an annular seal 34 for engagement with inner wall of the tubular casing 12. Seal 34 prevents untreated fluid to pass into the area between sidewall 35 and tubular casing 12. Top wall 31b after insertion of the primary filter 30 into the interior of sleeve filter 20, may rest on the top end of sidewall 22 and be retained thereon. Once in place, primary filter 30, with seal 34 extending outwardly therefrom an engaging tubular casing 12, forces fluid upward into the interior of the primary filter 30 through the opening at its lower portion 32 and outward through slots 36. Thus, normal flow is upward through the opening in the lower portion 32 and then outward for filtering thereby allowing particulate material to fall downward along the interior of sidewall 35 and out the opening of the sidewall lower portion 32.

Figure 4:
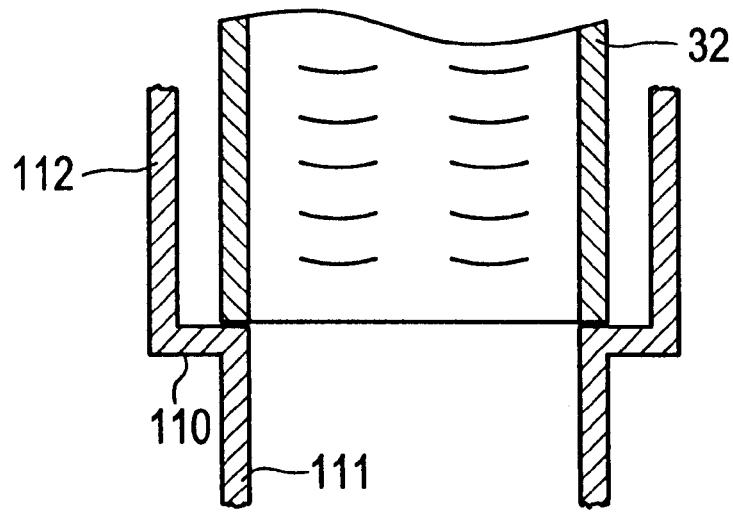
FIG. 4 is a close-up cross-sectional view of an alternative embodiment of the two-piece wastewater treatment system of the present invention.

Sidewall lower portion 32 may have annular seal 34 extending outwardly therefrom or may have an alternative seat shown in FIG. 4. The alternative embodiment in FIG. 4 modifies the tubular casing 12 as is shown in FIG. 4. Casing 112 has seat portion 110 extending inwardly therefrom and thereby providing a horizontal seating surface on which the sidewall lower portion 32 may rest. Depending from the seat portion 110 is lower portion 111 of the casing. In such an arrangement, the outwardly extending annular seal 34 may not be necessary in that the sidewall lower portion 32 rests firmly on horizontal seating portion 110 thereby preventing untreated or unfiltered fluid from flowing into the is area between sidewall lower portion 32 and tubular casing 112.

Figure 3:
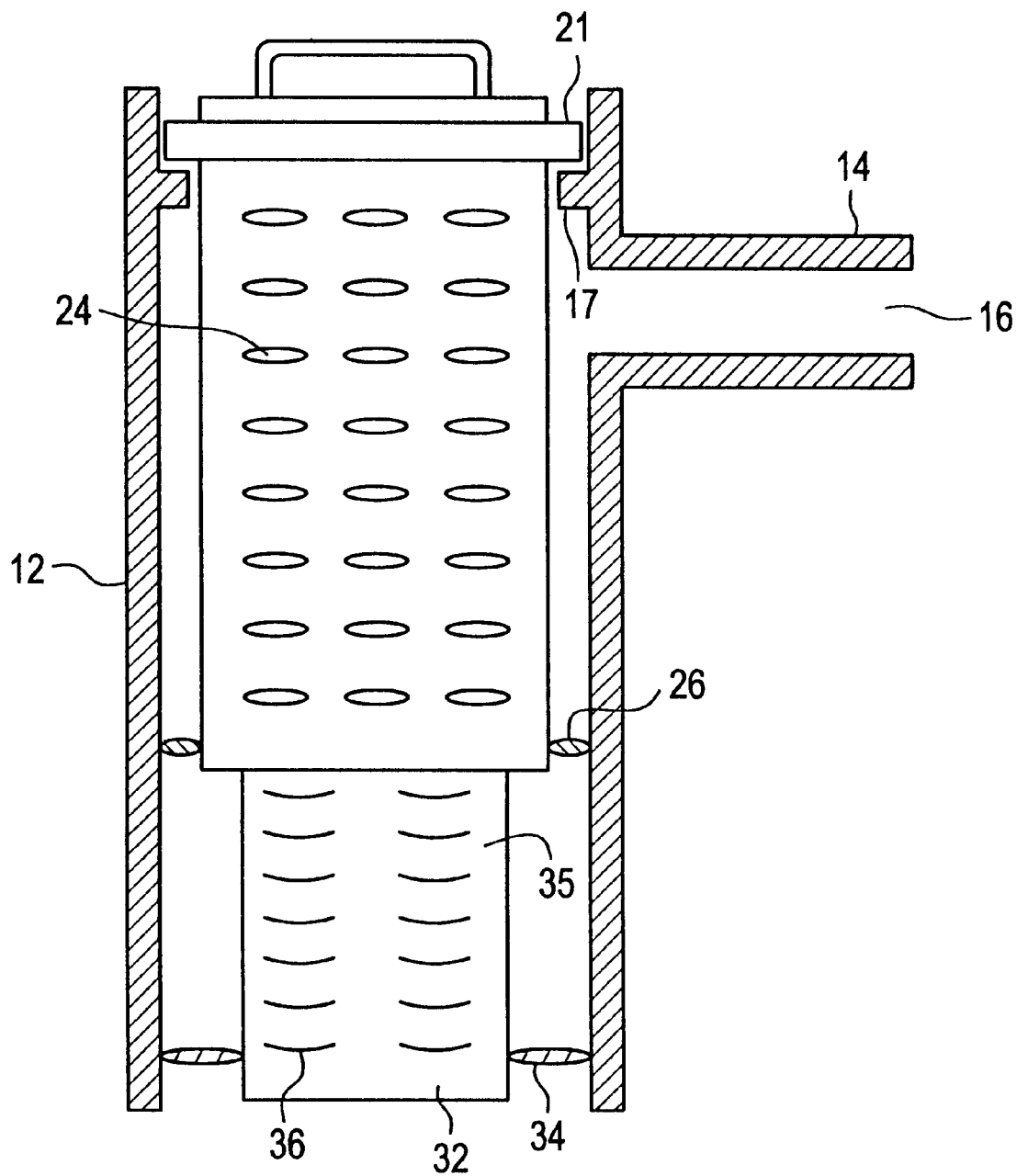
FIG. 3 is a partial sectional side-view of the wastewater treatment system of the present invention.

An additional embodiment is shown in FIG. 3 wherein tubular casing 12 is slightly modified so that an inwardly extending retaining rim 17 is formed such that the top rim 21 of the sleeve filter 20 may rest thereon. Thus, it may not be necessary to provide a frictional engagement fit between the top rim 21 of sleeve filter 20 and tubular casing 12. A slight frictional engagement may be provided however so that upon upward force on handle 31a for removal of the primary filter 30, the sleeve filter 20 remains in place.

Figure 5:
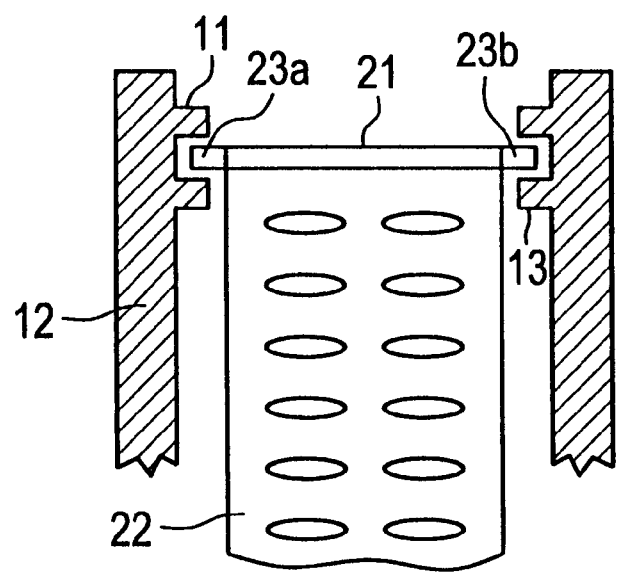
FIG. 5 is a partial sectional closeup of an alternative embodiment of the two-piece wastewater treatment system of the present invention.
Figure 6:
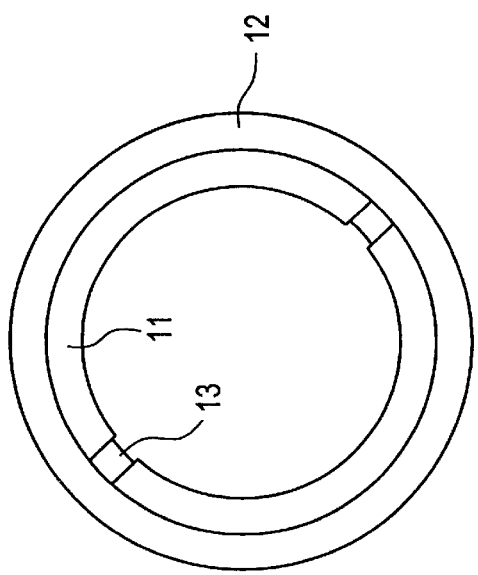
FIG. 6 is a top view of the tubular casing shown in FIG. 5.
Figure 7:
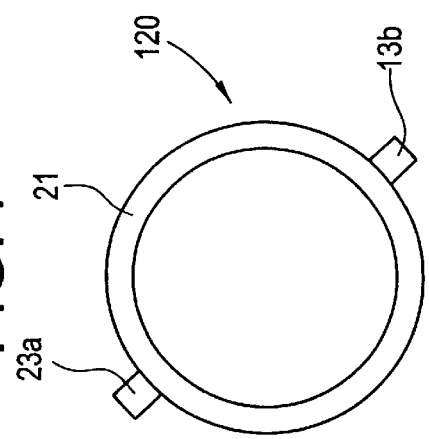
FIG. 7 is a top view of the sleeve filter shown in FIG. 5.

Alternatively, as is shown in FIG. 5, an upper retaining rim 11 and lower retaining rim 13 may be provided for firmly holding the top rim 21 in place. Top rim 21 of the sleeve filter 20 may have first retaining tab 23a and second retaining tab 23b as is depicted in FIG. 5 and FIG. 7. These retaining tabs 23a and 23b may work in conjunction with the upper retaining rim 11 and lower retaining rim 13. As shown in FIG. 6, slots 15 may be formed in the upper retaining rim 11 for receipt of first and second retaining tabs 23a and 23b when the sleeve filter 20 is inserted into place. Thus, retaining tabs 23a and 23b may be aligned with the openings 15 in the upper retaining rim 11. Lower retaining rim 13 will be a concentric and continuous inwardly directed rim upon which the retaining tabs 23a and 23b may rest. Thus, the sleeve filter 20 may be inserted between lower retaining rims 11 and 13 and retained therein securely thereby allowing the primary filter 30 to be pulled upwardly and outwardly from the sleeve filter 20 without vertical movement of the same.

Several procedures may be used to produce the sleeve filter 20 and primary filter 30 of the two-piece filtering system 10 of the present invention. The two-piece filtering system 10 can be a plastic cylindrical tube wherein the slots 24 and 36 may be cut into the sidewalls 22 and 35. Further, the cylindrical nature of the sleeve filter 20 and primary filter 30, is not necessarily a requirement. Other geometric shapes and designs are considered to fall within the teachings of the present invention and the depiction in the Figures is not meant to be limiting. The sleeve filter 20 and primary filter 30 may also be molded in elongated half sections and these sections fastened together along edges. In this case and particularly where the filter element is molded into halves which are assembled to form the tubular element, the internal configuration of the slots 24 and 36 can be adjusted to enhance the self-cleaning capabilities of the filter and of the cleaning mechanism instituted upon removal of primary filter 30 from sleeve filter 20.

In FIGS. 8 and 9, the sleeve filter 20 and the primary filter 30 are depicted. Annular seals 26 and 34 may be provided to isolate the effluent from the rest of the system. Thus, in conjunction with FIG. 1, it is apparent that the seal 34 initially prevents the unfiltered effluent from entering into the space between sidewall 35 and tubular casing 12. Annular seal 26 may also be provided to additionally isolate the area between the sidewall 22 of sleeve filter 20 and tubular casing 12. Therefor, a double filtering mechanism is thereby instituted once the primary filter 30 is inserted into the interior of the sleeve filter 20. Further, as is depicted in the embodiments herein, through frictional engagement or through a retaining or locking embodiment as is depicted in FIG. 3 or FIG. 5, the top rim 21 of sleeve filter 20 may further isolate the area and the outlet opening 16 of outlet 14 formed in tubular casing 12. All of the seals may be provided to engage the inner surface of the casing 12 to form a seal and prevent by-pass of fluid from the septic tank directly to the outlet opening 16.

Figure 10:
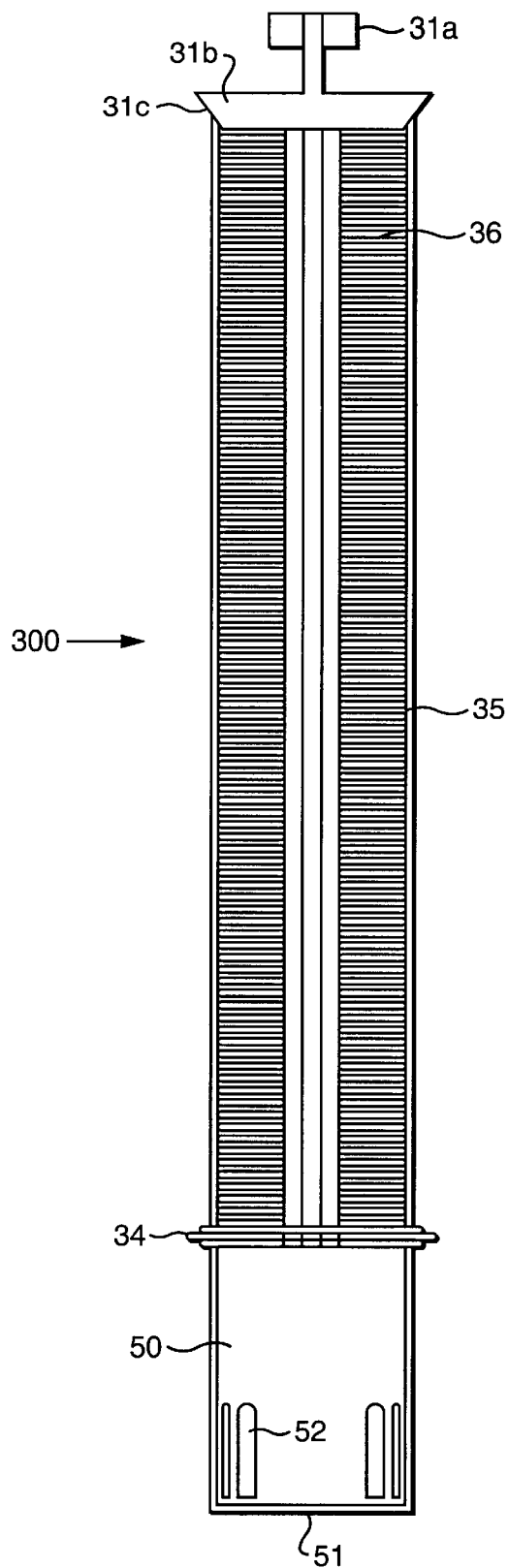

In FIG. 10, an alternative embodiment of the primary filter 300 is depicted which is comprised of a handle 31a, top wall 31b having bevelled surface 31c and side wall 35. Slots 36 are formed in side wall 35 and extend therethrough. At the lower end of the side wall is found annular seal 34 which extends outwardly from the side wall to contact the interior of sleeve filter 20. Extending therebelow is inlet extension 50 which has bottom wall 51 and apertures 52. Inlet extension 50 provides a lower extension of the primary filter 300 and allows the intake into the interior of the primary filter 300 to pass through openings 52 formed in extension 50. Bottom wall 51 prevents material from flowing upward into the interior of the primary filter without passing through apertures 52. This varies from the prior embodiment in that primary filter 30 has an open bottom portion allowing entry of the fluid to be filtered through a large opening thereof.

As can be readily seen, primary filter 300 fits into the sleeve filter 20 and rests therein. Top wall 31b may contact the rim 21 of the sleeve filter and may also have bevelled edge 31c for proper nestling therein. Bevel 31c in the top wall 31b also allows the top wall to seal with the rim 21 of the sleeve filter so that fluid may not enter therebetween. A plurality of slots 36 are provided in the sidewall 35 to filter fluid entering into the interior of the filter 300 through apertures 52. As with the original design, fluid enters into the interior or filter 300 and filters outward therefrom through slots 36. The fluid is then filtered again through the sleeve filter 20 before exiting through exit aperture 16. Seal 34 on filter 300 ensures that fluid may not enter upward between the primary filter side wall 35 and the casing wall 12. Seal 34 may act to clean the interior of side wall 22 of sleeve filter 20 when the primary filter 300 is removed therefrom by grasping handle 31a. Inlet extension 50 may also extend sufficiently below casing wall 12 such that the filter entry or opening is low enough in the fluid to be filter to be accessible for adequate fluid flow.

While examples within the scope of the present invention are shown and discussed with references to sewage treatment it will be understood that devices within the scope of the present invention can be equally effectively used in other applications such as for example the removal of sand and the like from drainage water as well as other wastewater treatment systems. It will also be understood that the forgoing examples are not by way of limitation of the present invention and that other arrangements also within the scope of the present invention will occur to those skilled in the art upon reading the disclosure set forth herein.

What is claimed is:

1. A two piece filter for a wastewater treatment system, comprising:
   a housing;
   a primary filter disposed within said housing, said primary filter having a first predefined length, a top wall and a side wall extending downward from said top wall, said side wall terminating at an end portion and forming a first opening therein;
   a plurality of slots extending through said side wall of said primary filter;
   a sleeve filter surrounding said primary filter, said sleeve filter having a second predefined length, a top rim and a depending side wall extending downward therefrom to a terminating end portion and forming a second opening circumscribing said primary filter above said first opening;
   a plurality of slots extending through said side wall of said sleeve filter;
   a first seal near said end portion of said primary filter between said primary filter and an inner surface of said housing; and a second outwardly extending seal near said end portion of said sleeve filter and between said sleeve filter and said inner surface of said housing.

2. The filter of claim 1 wherein said primary filter extends downward through said sleeve filter terminating end portion.

3. The filter of claim 1 wherein said seal on said primary filter extends outward from said side wall.

4. The filter of claim 1 wherein said primary filter and said sleeve filter are cylindrical.

5. The filter of claim 4 wherein said top wall of said primary filter has a larger diameter than said cylindrical side wall and wherein said top wall further has a handle extending upward therefrom.

6. The filter of claim 5 wherein said sleeve filter is further comprised of a top rim, said top rim removably retaining said top wall of said primary filter.

7. The filter of claim 6 further comprising a cylindrical casing, said cylindrical casing receiving said sleeve filter in frictional engagement therein.

8. The filter of claim 1 wherein said plurality of slots in said primary filter and said sleeve filter are horizontal ovals.

9. The filter of claim 1 wherein said first predefined length is greater than said second predefined length.

10. A two piece filter device for wastewater treatment system, comprising:

a primary filter having a top wall and a depending side wall extending downward to form an open end, said side wall having a plurality of slots formed therethrough;

a sleeve filter spaced apart from and surrounding said primary filter, said sleeve filter having a top rim portion and a depending side wall extending downward to form an open end, said depending side wall having a plurality of slots formed therethrough, said top rim having an inwardly directed surface for contacting said top wall of said primary filter and removably retaining said primary filter within said side wall of said sleeve filter;

an annular seal extending outward from said side wall of said primary filter and an annular seal extending outward from said side wall of said sleeve filter.

11. The two piece filter of claim 10 wherein said primary filter extends downward through said sleeve filter and outward from a bottom terminating edge of said sleeve filter side wall.

12. The filter of claim 10 wherein said primary filter and said sleeve filter are cylindrical.

13. The filter of claim 10 wherein said side wall of said primary filter has a first predefined length, said side wall of said sleeve filter has a second predefined length, said first predefined length being greater than said second predefined length.

14. The filter of claim 13 further comprising a tubular casing, said tubular casing receiving said two piece filter therein.

15. The filter of claim 14 wherein said primary filter further has an inlet extension extending below said annular seal.

16. The filter of claim 15 wherein said inlet extension has a plurality of openings therethrough.

17. The filter of claim 16 wherein said inlet extension is coextensive with said primary filter side wall.

18. The filter of claim 10 further comprising an inlet extension extending downward from said side wall of said primary filter.

19. The filter of claim 18 wherein said inlet extension is coextensive with said side wall of said primary filter.

20. The filter of claim 19 wherein said inlet extension has a plurality of apertures formed therein and has a bottom wall.

* * * * *

UNITED STATES PATENT AND TRADEMARK OFFICE
CERTIFICATE OF CORRECTION

PATENT NO. : 6,338,797 B1  
DATED : April 02, 2002  
INVENTOR(S) : Harry Nurse, Jr. and Theophilus B. Terry, III It is certified that error appears in the above-identified patent and that said Letters Patent is hereby corrected as shown below:

<u>Title page,</u>  
Item[75], change the inventor's name from "Theophilis" to -- Theophilus --;

Item[56], Reference Cited, U.S. PATENT DOCUMENTS, change "3,443,366--; to --3,443,366--;

<u>Column 3,</u>  
Line 42, delete -- is --;

<u>Column 4,</u>  
Line 66, delete -- is --.

Signed and Sealed this

Eighteenth Day of February, 2003

JAMES E. ROGAN  
*Director of the United States Patent and Trademark Office*